US007710236B2

(12) United States Patent
Jozwiak

(10) Patent No.: US 7,710,236 B2
(45) Date of Patent: May 4, 2010

(54) FUSE SYSTEMS WITH SERVICEABLE CONNECTIONS

(75) Inventor: Andrew J. Jozwiak, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 217 days.

(21) Appl. No.: 11/827,093

(22) Filed: Jul. 10, 2007

(65) Prior Publication Data

US 2008/0030294 A1 Feb. 7, 2008

Related U.S. Application Data

(60) Provisional application No. 60/834,591, filed on Aug. 1, 2006.

(51) Int. Cl.
*H01H 85/46* (2006.01)
*H01H 85/143* (2006.01)
*H01R 13/64* (2006.01)
*H01R 4/48* (2006.01)
*H02B 1/26* (2006.01)

(52) U.S. Cl. ....................... 337/187; 337/268; 337/251; 337/269; 439/250; 439/830; 439/890; 361/626

(58) Field of Classification Search ................. 337/159, 337/187, 251, 268–269; 439/250, 830, 890; 361/626
See application file for complete search history.

(56) References Cited

U.S. PATENT DOCUMENTS 3,237,060 A * 2/1966 Ross .......................... 361/519
3,437,736 A * 4/1969 Claypoole et al. ........... 174/533
3,668,476 A * 6/1972 Wrabel et al. ............... 361/785
3,723,932 A * 3/1973 Miller et al. ................ 337/405
4,346,345 A * 8/1982 Welz .......................... 324/110
4,394,639 A * 7/1983 McGalliard ................. 337/292
4,499,447 A * 2/1985 Greenberg .................. 337/266
4,775,064 A * 10/1988 Baxter ........................ 215/230
4,815,993 A * 3/1989 Falchetti ................ 439/620.33
4,909,552 A * 3/1990 Weber et al. ................ 292/320
4,912,449 A * 3/1990 Bonhomme ................. 337/244
5,099,219 A * 3/1992 Roberts ...................... 337/297
5,281,171 A * 1/1994 Job ....................... 439/620.26
5,471,193 A * 11/1995 Peterson et al. ............. 340/438
5,552,757 A 9/1996 Blecha et al.
5,629,663 A * 5/1997 Seki et al. ................... 337/186
5,654,701 A * 8/1997 Liao et al. ..................... 341/22
5,659,283 A * 8/1997 Arratia ....................... 337/206
5,662,245 A * 9/1997 Grant .................... 222/153.07
5,808,859 A * 9/1998 Liang ......................... 361/673
5,818,320 A * 10/1998 Matsuoka ................... 337/198
5,894,925 A * 4/1999 Sukiennik et al. ........... 206/356
5,923,239 A 7/1999 Krueger et al.

(Continued)

FOREIGN PATENT DOCUMENTS

DE 3040884 5/1982

(Continued)

*Primary Examiner*—Jayprakash N Gandhi
*Assistant Examiner*—Bradley H Thomas
(74) *Attorney, Agent, or Firm*—Thomas N. Twomey

(57) ABSTRACT

A fuse system has both a non-serviceable fuse and a fuse terminal system for selectively installing a serviceable fuse. When installed, the serviceable fuse provides a current flow path parallel to the non-serviceable fuse.

13 Claims, 5 Drawing Sheets

U.S. PATENT DOCUMENTS

| | | | | |
|---|---|---|---|---|
| 5,928,004 | A | 7/1999 | Sumida et al. | |
| 6,007,350 | A | 12/1999 | Isshiki | |
| 6,107,908 | A * | 8/2000 | Santa Cruz et al. | 337/241 |
| 6,119,898 | A * | 9/2000 | Dark | 222/153.06 |
| 6,260,942 | B1 * | 7/2001 | Ahne et al. | 347/19 |
| 6,330,959 | B1 * | 12/2001 | Dark | 222/153.1 |
| 6,411,482 | B1 * | 6/2002 | Funke | 361/91.1 |
| 6,416,091 | B1 * | 7/2002 | Wenk et al. | 292/320 |
| 6,878,004 | B2 * | 4/2005 | Oh | 439/250 |
| 2002/0008607 | A1 * | 1/2002 | Castonguay et al. | 337/206 |
| 2002/0135481 | A1 * | 9/2002 | Conwell et al. | 340/572.1 |
| 2003/0205777 | A1 | 11/2003 | Ito et al. | |
| 2004/0041887 | A1 * | 3/2004 | Beilman et al. | 347/86 |
| 2004/0196135 | A1 * | 10/2004 | Clair | 337/198 |
| 2004/0209028 | A1 * | 10/2004 | Gosselin | 428/40.1 |
| 2004/0252446 | A1 * | 12/2004 | Friedrich et al. | 361/600 |
| 2005/0029158 | A1 * | 2/2005 | Moore et al. | 206/723 |
| 2005/0062578 | A1 * | 3/2005 | Ackermann | 337/187 |
| 2005/0233515 | A1 | 10/2005 | Ng et al. | |
| 2005/0275499 | A1 * | 12/2005 | Kita | 337/186 |
| 2006/0017540 | A1 * | 1/2006 | Smith | 337/242 |
| 2006/0046526 | A1 * | 3/2006 | Minich | 439/65 |
| 2006/0100576 | A1 * | 5/2006 | Wang | 604/110 |
| 2006/0165465 | A1 * | 7/2006 | Wu | 400/491 |

FOREIGN PATENT DOCUMENTS

| | | | |
|---|---|---|---|
| DE | 3723832 | | 7/1987 |
| DE | 3743482 | A1 * | 7/1989 |
| FR | 2852140 | | 9/2004 |
| FR | 2899997 | | 10/2007 |
| WO | 03/077395 | | 9/2003 |

* cited by examiner

FUSE SYSTEMS WITH SERVICEABLE CONNECTIONS

CROSS-REFERENCE TO RELATED APPLICATIONS

This application claims the benefit of U.S. Provisional Application 60/834,591 entitled FUSES WITH SERVICEABLE CONNECTIONS filed Aug. 1, 2006, the entirety of which is hereby incorporated herein by reference.

TECHNICAL FIELD

The present disclosure generally relates to fuse systems and, in particular, to an electrical fuse system having both a non-serviceable fuse and a serviceable connection facilitating use of a serviceable fuse, if needed.

BACKGROUND

Fuses are commonly-used in various products to protect electrical components and wiring from receiving unintended high levels of electrical current that could otherwise damage the protected components and wiring. In particular, fuses are positioned in electrical circuits between the power source and the component or wiring to be protected. When a fuse experiences an electrical current level that exceeds a threshold current (rated for the particular fuse), the fuse "blows," thereby disconnecting the power source from the protected wiring or component. Thus, the protected component or wiring is protected from the unintended high current level.

Many electrical distribution centers, such as those used for motor vehicles, utilize loose-piece replaceable fuses to protect electrical components and wiring. These replaceable fuses come in various sizes with various current-handling capabilities and are typically chosen based on the current-carrying requirements of the circuit they are intended to protect. They are typically installed between two terminals in a system in an accessible location. If such a conventional serviceable fuse blows in the field, it is may be replaced with a similar fuse by a consumer or service person, such as, in the case of motor vehicles, a mechanic in a garage. Examples of replaceable fuses may be found in U.S. Pat. No. 5,346,411 entitled "Tap-In Blade Fuse"; U.S. Pat. No. 2,527,160 entitled "Plug Type Fuse"; and U.S. Pat. No, 3,581,262 entitled "Safety Fuse With Glass Coating On Fusible Portion." Such replaceable fuses offer the advantage of being readily available to the consumer or the mechanic at the time that a replacement is needed. When replacement fuses are in an accessible location, they are readily removed and replaced and are therefore referred to herein as "serviceable fuses."

As an alternative to the above-described serviceable fuses, some electrical distribution centers use non-replaceable or "non-serviceable fuses" to protect electrical components and wiring. Non-replaceable fuses are commonly integrated onto circuit boards during manufacture and cannot be replaced or serviced without replacing the entire circuit board. Examples of non-serviceable fuses may be found in United States Patent Application Number 2005233515 entitled "Method Of Etching A Semiconductor Device"; United States Patent Application Number 2003205777 entitled "Integrated Fuse With Regions Of Different Doping Within The Fuse Neck"; U.S. Pat. No. 5,552,757 entitled "Surface-Mounted Fuse Device"; U.S. Pat. No. 5,923,239 entitled "Printed Circuit Board Assembly Having An Integrated Fusible Link"; and German Patent Number 3,723,832 entitles "Printed Circuit With An Integrated Fuse." Other "non-serviceable fuses within the meaning of this disclosure include fuses that would otherwise be replaceable but for their physical location in the system (i.e., fuses that are positioned in inaccessible locations).

While serviceable fuses are conveniently replaceable, they can represent a significant cost to the manufacturer of the original product in comparison to the use non-serviceable fuses. A serviceable fuse is more costly to manufacture than a non-serviceable fuse. Further, a serviceable fuse must be physically installed, either manually or by machine, in the terminals in the electrical distribution center assembly, thereby adding additional steps and costs to the manufacturing process. Even where the installation is accomplished automatically, various steps in the automated process, such as manual loading of the supply tubes for the automatic insertion equipment, must still be performed manually. On the other hand, non-serviceable fuses are less costly to manufacture and they do not require any special handling or fixturing. However, when such a non-serviceable fuse blows, it is not possible for a mechanic or consumer to rapidly and inexpensively replace the fuse alone. Instead, the entire device or a circuit board (on which the non-serviceable fuse resides) must be replaced when a non-serviceable fuse blows. Thus, it is significantly more costly to replace a non-serviceable fuse (i.e., replace an entire circuit board) than to replace a serviceable fuse.

As a result, a dilemma exists in designing fuses into electrical systems. It may be advantageous to a manufacturer to choose a non-serviceable fuse instead of a serviceable fuse at the time of manufacture to save manufacturing cost. However, it may be disadvantageous to have a non-serviceable fuse rather than a serviceable fuse at the time that a repair is needed, since the repair will be more expensive. Thus, the choice of a non-serviceable fuse may increase warranty cost and consumer dissatisfaction. Hence, in retrospect, if the fuse never blows, a non-serviceable fuse is more cost effective, but if the fuse blows during the lifetime of the electrical system, a serviceable fuse is more cost effective.

The embodiments disclosed herein are intended to address this dilemma. Further areas of applicability of the present invention will become apparent from the detailed description provided herein. It should be understood that the detailed description and specific examples, while indicating preferred embodiments of the present invention, are intended for purposes of illustration only, since various changes and modifications within the spirit and scope of the invention will become apparent to those skilled in the art from this detailed description.

SUMMARY

The present application discloses a fuse system having both a non-serviceable fuse and a fuse terminal system for selectively installing a serviceable fuse. The fuse terminal system has first and second terminals for selectively connecting a serviceable fuse in electrical parallel with the non-serviceable fuse.

BRIEF DESCRIPTION OF THE DRAWINGS

Embodiments of the present invention will now be described by way of example in greater detail with reference to the attached figures, in which.

DETAILED DESCRIPTION

Figure 1A:
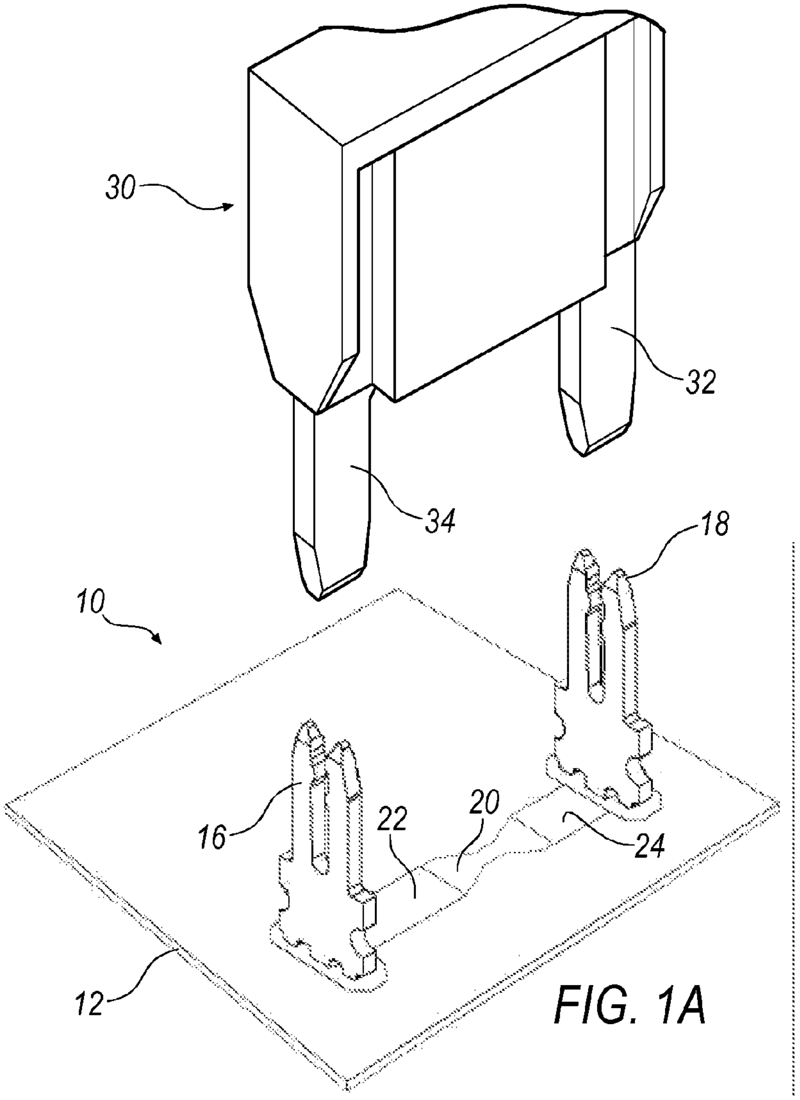
FIG. 1A is a perspective exploded view of an exemplary fuse system wherein a printed circuit type non-serviceable fuse for protecting a component of an electrical system (not shown) is in electrical parallel with a fuse terminal system for a serviceable fuse, and illustrating a serviceable fuse.

Disclosed herein is a fuse system having both a non-serviceable fuse and a fuse terminal system for selectively installing a serviceable fuse. The fuse terminal system has first and second terminals for selectively connecting a serviceable fuse in electrical parallel with the non-serviceable fuse. The "non-serviceable fuse" is, in most embodiments, a non-replaceable type fuse integrated onto a circuit board, but it may also be other types of fuses that are difficult to service, such as a replaceable type fuse that is particularly inaccessible to the mechanic or consumer at the time replacement is needed. The fuse terminal system is configured to be used with replaceable fuses, such as those commonly used in motor vehicle applications or in consumer electronics, referred to herein as "serviceable fuses."

Refer now to the drawings wherein like numerals indicate like or corresponding parts throughout the several views and exemplary embodiments are illustrated. FIGS. 1A and 3-5 illustrate an exemplary fuse system 10 protecting an electrical component (not shown), which may include an electrical device, an electrical circuit, or electrical wiring. The fuse system 10 includes both (i) a non-serviceable fuse 20 disposed between electrical contacts 22 and 24 and (ii) a terminal system comprising terminals 16 and 18 for selectively connecting a serviceable fuse 30. Terminals 16 and 18 are in electrical communication with contacts 22 and 24, respectively. The fuse system 10 is intended to be electrically connected at terminals 22 and 24 generally between a power source (not shown) and the protected electrical component. The fuse system 10 may be assembled on a board 12, such as a printed circuit board. As will be described later herein, the board 12 may be used solely for the fuse system 10, may support additional fuse assemblies or, alternatively, may support the electrical component protected by the fuse system 10.

In the exemplary embodiment shown in FIG. 1A and FIGS. 3-7, the non-serviceable fuse 20 is a trace of a printed circuit board configured in such a way so that it will "blow" and open the circuit to disconnect the protected component from the power source when the current flowing through the non-serviceable fuse 20 exceeds a predetermined threshold current level. The predetermined current threshold or "rating" of fuse 20 is accomplished, for example, by adjusting the trace width and/or shape of the fuse 20.

Figure 1B:
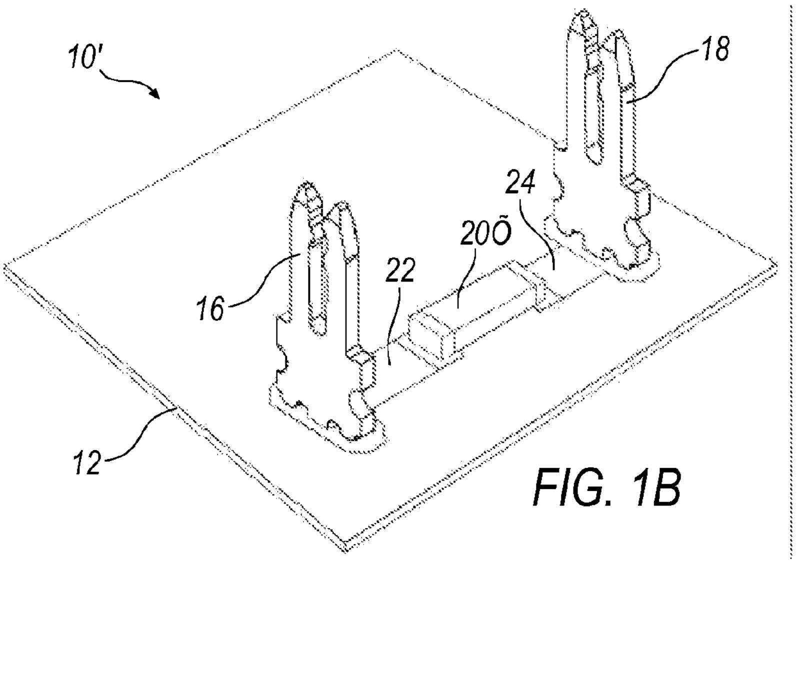
FIG. 1B is a perspective view of an alternative fuse system to that shown in FIG. 1A having a surface mounted non-serviceable fuse.

FIG. 1B illustrates an alternative exemplary fuse system 10', which is similar to the fuse system 10 of FIG. 1A except that the non-serviceable fuse 20' in FIG. 1B is a low cost surface mountable fuse that is surface mounted to the board 12'. As will be appreciated by those skilled in the art, various other types of non-serviceable fuses can be used in place of non-serviceable fuse 20 (FIG. 1A) or non-serviceable fuse 20' (FIG. 1B) to reduce the original cost of manufacturing the fuse system as compared to using a serviceable fuse.

Figure 2:
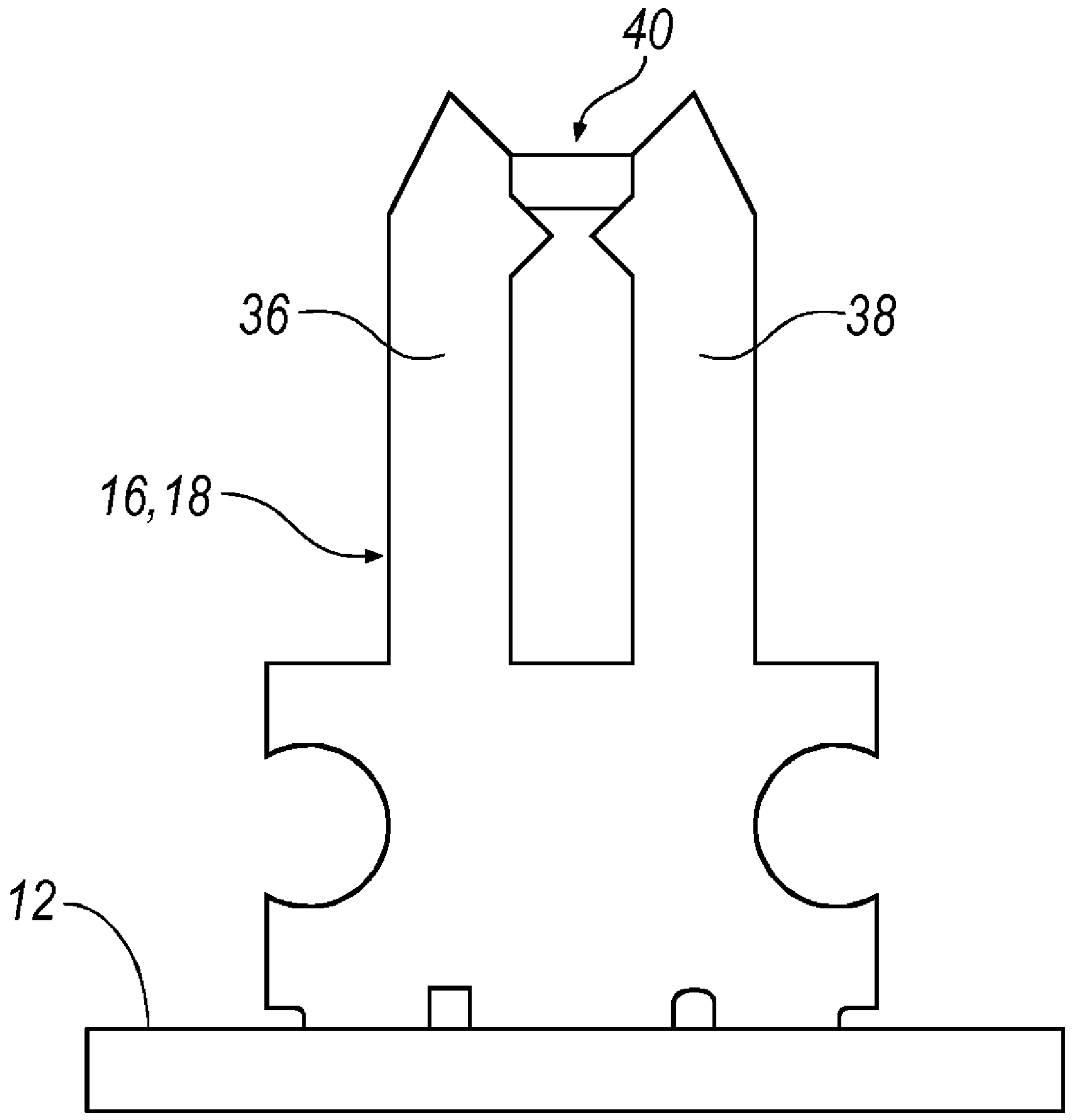
FIG. 2 is a side elevation view of the exemplary fuse system of FIGS. 1A and 1B illustrating frangible material on a fuse terminal.
Figure 4:
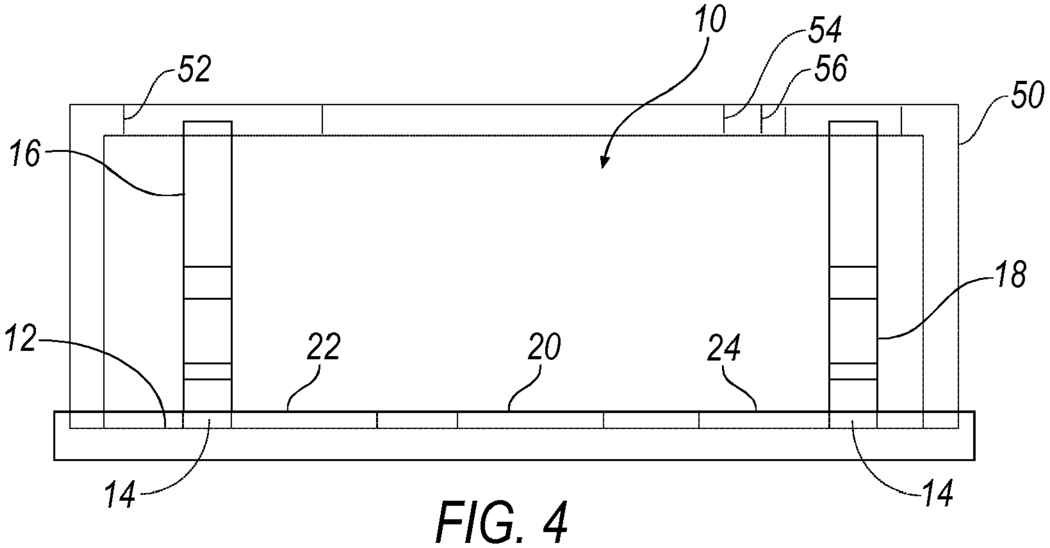
FIG. 4 is a front elevation view of the exemplary fuse system of FIGS. 1A and 3 with a housing shown in phantom line.

The exemplary fuse terminal system (i.e., terminals 16 and 18) shown in FIG. 1A may be surface-mounted to the board 12 or may be mounted to the board 12 by inserting terminal leads 14 into the board 12, as shown in FIGS. 2 and 4. The fuse terminal system is configured to receive and electrically connect a serviceable fuse 30 via fuse blades 32 and 34. When installed, serviceable fuse 30 is electrically parallel to non-serviceable fuse 20.

Figure 5:
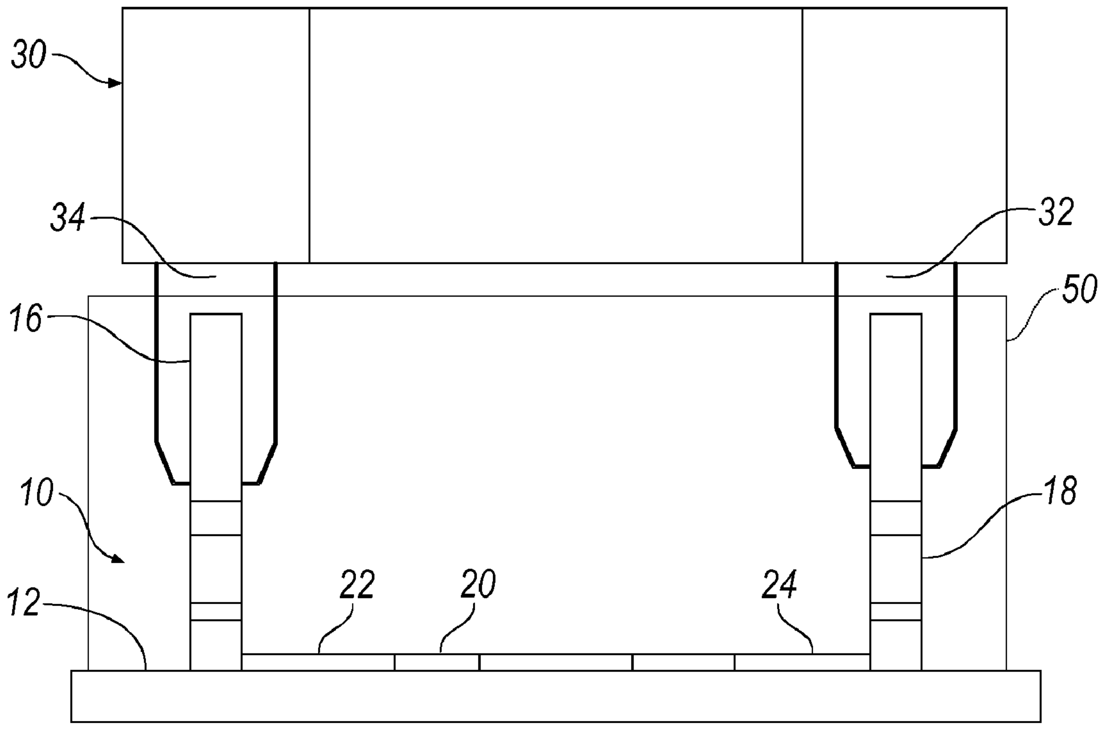
FIG. 5 is the front elevation view of the exemplary fuse system of FIGS. 1A, 3 and 4 with a serviceable fuse installed.

FIG. 2 illustrates a more detailed view of the exemplary terminals 16 and 18 as shown in FIGS. 1A and 1B. Terminals 16 and 18 each have fingers 36 and 38 that resiliently accept and secure the blades 32 and 34 (from FIGS. 1A and 1B), respectively, and engage the blades to provide an electrical connection to the serviceable fuse 30. At least one of the terminals 16 and 18 may be provided with a web 40 of frangible material extending between the fingers 36 and 38. The web 40 is broken by the blade 32 or 34 of a serviceable fuse 30, when it is inserted between the fingers 36 and 38, as shown in FIG. 5. A broken web 40 provides a visual indication that a serviceable fuse 30 has been used in the fuse system 10. This indication may be useful if, during or after servicing an electrical component, a consumer or a service technician cannot remember whether a replacement or serviceable fuse 30 was removed from the fuse terminal assembly of this fuse system 10 or from another fuse system. Though one particular type of fuse terminal system and serviceable fuse is shown in FIGS. 1A-5, various other types of known fuse terminal systems and serviceable fuses can be used in place thereof.

Figure 3:
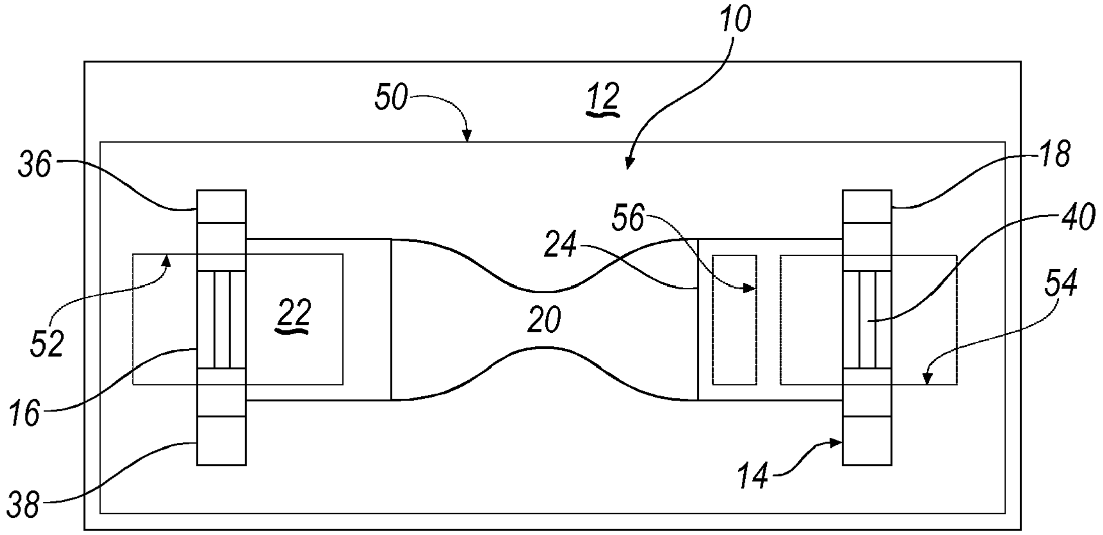
FIG. 3 is a top view of the exemplary fuse system of FIG. 1A with a housing shown in phantom line.

As shown in FIGS. 3 and 4, the fuse system 10 may include a cover 50, which cooperates with the board 12 to form a housing or enclosure. The cover 50 may be similar to the covers for protecting terminal assemblies conventionally used with serviceable fuses 30 that are provided as original equipment by manufacturers. The cover 50 may cover multiple fuse systems 10 or 10' or other components associated with the board 12. The cover 50 is provided with slots 52 and 54 proportioned to permit the blades 32 and 34 of the serviceable fuse 30 to extend therethrough.

A web 56 of material, which may be formed in a molding process when the cover 50 is created, may be provided across at least one of the slots or apertures 52 or 54. The web 56 may be broken by one of the blades 32 or 34 of a replacement or serviceable fuse 30 when a serviceable fuse is installed in the terminal assembly, as shown in FIG. 5. It will be appreciated that web 40 described previously and shown in FIGS. 2 and 3, may be used in addition to or, alternatively, instead of web 56 shown in FIGS. 3 and 4 to provide a visual indication that a serviceable fuse 30 has at some time been used with fuse system 10.

Thus, in use, the fuse system 10 or 10' described above relies upon non-serviceable fuse 20 or 20' to provide protection against unintended high electrical currents in the first instance. If and when the non-serviceable fuse blows, it can be easily "replaced" by installing a serviceable fuse 30 in the fuse terminal system (terminals 16 and 18). If the non-serviceable fuse never blows, then there is no need to ever install a serviceable fuse. In this way, the initial cost of manufacturing the electrical system is reduced as compared to having to install at the outset a serviceable fuse that may never blow, while, at the same time, the fuse terminal system provides a relatively convenient and low-cost option for "replacing" a blown non-serviceable fuse (with a serviceable fuse) without having to replace the entire circuit board.

FIGS. 6A, 6B, 6C, 7 and 8 show schematic circuit diagrams of various ways in which fuse systems 10 and 10' shown in FIGS. 1A and 1B can be arranged on circuit boards. As shown in FIGS. 6A, 6B, 6C, 7 and 8, a fuse system 110 or 210 (corresponding to fuse systems 10 and 10' in FIGS. 1A and 1B) may be used locally with the electrical component being protected by the fuse system as well as remotely therefrom. For example, as shown in each of FIGS. 6A-6C, an electrical component 100 is protected by a fuse system 110 including non-serviceable fuse 120, such as the non-serviceable fuses 20 and 20' described above. The fuse system 10 further includes a fuse terminal system having terminals 116 and 118, such as the terminals 16 and 18 described above. The terminals 116 and 118 are adapted to accept a serviceable fuse (not shown), such as serviceable fuse 30 described above, to be connected electrically in parallel with the non-serviceable fuse 120 in the event that the non-serviceable fuse has blown.

Figure 6A:
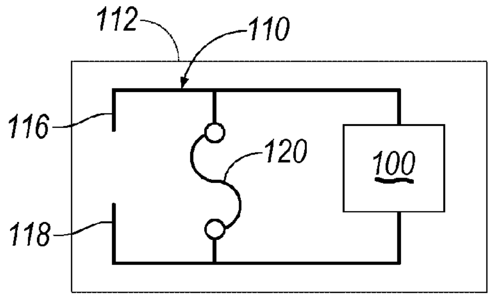
FIG. 6A is a schematic view of an exemplary fuse system protecting a local electrical component.
Figure 6B:
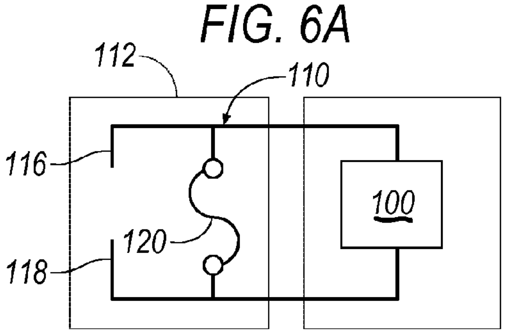
FIG. 6B is an alternative schematic view of an exemplary fuse system protecting a remote electrical component.
Figure 6C:
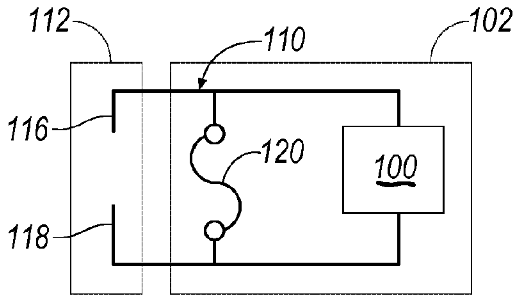
FIG. 6C is an alternative schematic view of an exemplary fuse system wherein the non-serviceable fuse protects a local electrical component and the fuse terminal system is located remotely from the electrical component.

In the embodiment shown in FIG. 6A, the component 100 may be mounted on the same board 112 as is mounted both the non-serviceable fuse 120 and the terminals 116 and 118. In the embodiment shown in FIG. 6B, the non-serviceable fuse 120 may be mounted on the same board 112 as the terminals 116 and 118, but the board 112 may be remotely located relative to the component 100. In the embodiment shown in FIG. 6C, the non-serviceable fuse 120 may be part of an assembly 102 that includes the component 100 and is remotely located from the terminals 116 and 118.

Figure 7:
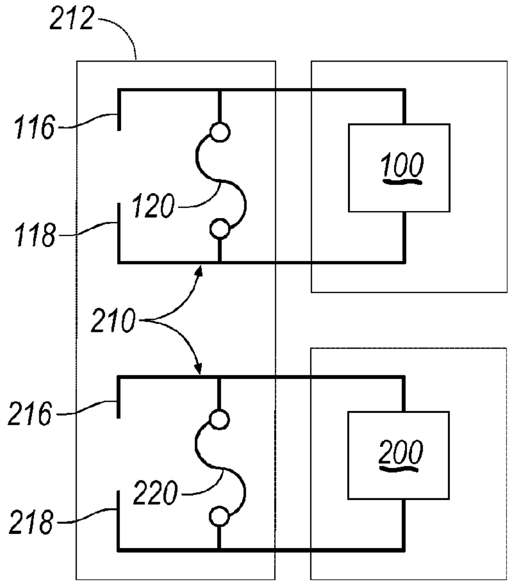
FIG. 7 is a schematic drawing view of an exemplary fuse system protecting multiple remote electrical components.
Figure 8:
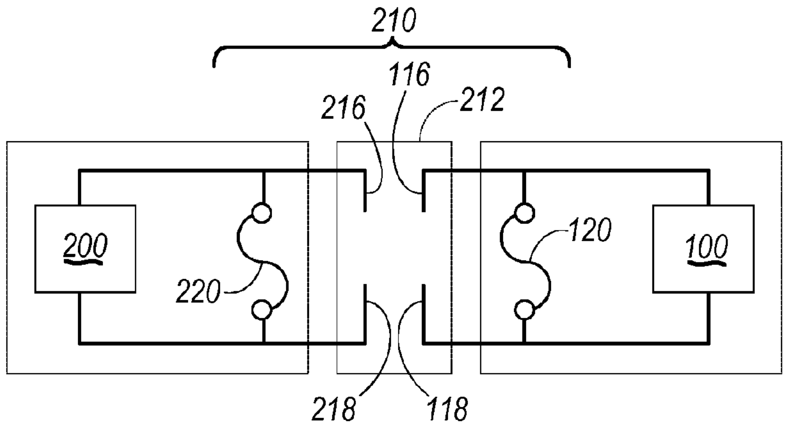
FIG. 8 is a schematic drawing view of an exemplary fuse system with non-serviceable fuses protecting multiple electrical components locally wherein each of the non-serviceable fuses is provided with a remote fuse terminal system for a serviceable fuse at a electrical distribution location.

In some embodiments, as shown in FIGS. 7 and 8, a fuse system 210 may be used advantageously to protect multiple electrical components 100 and 200 disposed remote from a common board 212, such as an electrical distribution center. As shown in the embodiment of FIG. 7, the board 212, may be provided with a first non-serviceable fuse 120 connected in series with and protecting electrical component 100 and a second non-serviceable fuse 220 connected in electrical series with and protecting electrical component 200. The board 212 of FIG. 7 is further provided with a first fuse terminal system having terminals 116 and 118 connected in electrical parallel with the first non-serviceable fuse 120 and a second fuse terminal system having terminals 216 and 218 connected in electrical parallel with the second non-serviceable fuse 220 to respectively accept serviceable fuses (not shown) as needed to protect the remotely located components 100 and 200. Alternatively, as shown in the embodiment of FIG. 8, a common board 212 may support the terminals 116, 118, 216 and 218 while the serviceable fuses 120 and 220 may be remotely located relative to the board 212. In particular, the serviceable fuses 120 and 220 may be collocated with the respective components 100 and 200 which they protect.

It is to be understood that the above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. A fuse system, comprising:

a non-serviceable fuse;

a fuse terminal system having first and second terminals configured to selectively receive a serviceable fuse in parallel electrical connection to the non-serviceable fuse;

a housing at least partially enclosing the fuse terminal system and having at least one aperture to permit insertion of at least a portion of the serviceable fuse therethrough; and an indicator being formed of a frangible material and extending across the at least one aperture;

wherein the indicator is irreversibly broken upon insertion of at least the portion of the serviceable fuse in to the at least one aperture therethrough.

2. The fuse system of claim 1 further including:

a second non-serviceable fuse; and a second fuse terminal system having third and fourth terminals for selectively connecting a second serviceable fuse in electrical parallel with the second non-serviceable fuse.

3. The fuse system of claim 1 wherein the housing encloses the non-serviceable fuse and exposes the fuse terminal system to permit connection of the serviceable fuse external to the housing.

4. The fuse system of claim 1 wherein the non-serviceable fuse is a solid state device.

5. The fuse system of claim 1 wherein the non-serviceable fuse is printed on a circuit board.

6. The fuse system of claim 1 wherein the non-serviceable fuse is a non-replaceable fuse surface mounted on a circuit board.

7. The fuse system of claim 1 wherein the indicator is frangible material on the fuse terminal system which is removed when the serviceable fuse is connected to the fuse terminal system.

8. An electrical system, comprising:

an electrical circuit having at least one electrical component;

a non-serviceable fuse in series electrical connection to the at least one component;

a fuse terminal system having first and second terminals for selectively connecting a serviceable fuse in parallel electrical connection to the non-serviceable fuse;

a housing at least partially enclosing the fuse terminal system and having at least one aperture to permit insertion of at least a portion of the serviceable fuse therethrough; and an indicator being formed of a frangible material and extending across the at least one aperture;

wherein the indicator is irreversibly broken upon insertion of at least the portion of the serviceable fuse in to the at least one aperture therethrough.

9. The system of claim 8 wherein the fuse terminal system is physically remote from the at least one electrical component.

10. The fuse system of claim 8 wherein both the electrical component and non-serviceable fuse are physically remote from the fuse terminal system.

11. The fuse system of claim 8 wherein the housing encloses the non-serviceable fuse and exposes the fuse terminal system to permit connection of the serviceable fuse external to the housing.

12. A method of protecting an electrical component from an electrical current above a threshold level delivered by a power source, comprising:

connecting a non-serviceable fuse in a fuse terminal system between the power source and the electrical component;

providing a first and second terminal in the fuse terminal system such that an electrical connection made by installation of a serviceable fuse between the first and second terminal creates a current flow path in parallel electrical connection to the non-serviceable fuse;

providing a housing at least partially enclosing the fuse terminal system and having at least one aperture to permit insertion of at least a portion of the serviceable fuse therethrough; and providing an indicator being formed of a frangible material and extending across the at least one aperture, wherein installation of the serviceable fuse in to the first and second terminal through the at least one aperture irreversibly breaks the indicator upon insertion of at least the portion of the serviceable fuse in to the at least one aperture therethrough.

13. The method of claim 12 further comprising the step of inserting the serviceable fuse into the first and second terminal through the at least one aperture after the non-serviceable fuse blows.

* * * * *